(12) United States Patent
Connor et al.

(10) Patent No.: US 6,861,400 B2
(45) Date of Patent: Mar. 1, 2005

(54) OLIGOMERIC HYDROPHOBIC DISPERSANTS AND LAUNDRY DETERGENT COMPOSITIONS COMPRISING OLIGOMERIC DISPERSANTS

(75) Inventors: Daniel Stedman Connor, Cincinnati, OH (US); Rafael Ortiz, Milford, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 391 days.

(21) Appl. No.: 10/208,940

(22) Filed: Jul. 31, 2002

(65) Prior Publication Data

US 2003/0069157 A1 Apr. 10, 2003

Related U.S. Application Data
(60) Provisional application No. 60/347,753, filed on Jan. 11, 2002, provisional application No. 60/328,544, filed on Oct. 11, 2001, and provisional application No. 60/311,882, filed on Aug. 13, 2001.

(51) Int. Cl.$^7$ .............................. C11D 1/14; C11D 1/83; C11D 3/34; C11D 3/39
(52) U.S. Cl. ...................... 510/310; 510/303; 510/311; 510/336; 510/337; 510/340; 510/356; 510/357; 510/360; 510/375; 510/376; 562/45; 562/88; 562/89; 562/100; 562/101
(58) Field of Search ................................ 510/336, 337, 510/340, 303, 310, 311, 356, 357, 360, 375, 376; 562/88, 45, 89, 100, 101

(56) References Cited
U.S. PATENT DOCUMENTS 3,234,258 A    2/1966   Morris (List continued on next page.)

FOREIGN PATENT DOCUMENTS

DE    196 17 939      10/1997
EP    0 164 817       12/1985
WO    WO 99 49963     10/1999

*Primary Examiner*—Gregory R. Del Cotto
(74) *Attorney, Agent, or Firm*—Laura R. Grunzinger; Kim William Zerby; Steven W. Miller

(57) ABSTRACT

The present invention relates to novel hydrophobic soil dispersants having the formula:

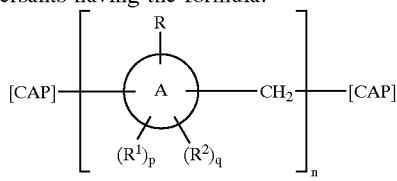

wherein A units are arylene units, one of which is phenyl, anthryl, or phenanthryl; each R is independently hydrogen, linear or branched $C_1$–$C_4$ alkyl, —$O(R^3O)_mR^4$, and mixtures thereof; $R^3$ is $C_2$–$C_4$ linear or branched alkylene, $R^4$ is hydrogen, $C_1$–$C_4$ alkyl, phenyl, phenyl sulphonate, —$CH_2CH(SO_3M)CH_2OH$, —$CH_2CH(OH)CH_2SO_3M$, —$(CH_2)_eSO_3M$, —$(CH_2)_fCO_2M$, —$(CH_2)_eCH(SO_3M)$-$CH_2SO_3M$, —$(CH_2)_eCH(SO_2M)$-$CH_2SO_3M$, —$(CH_2)_f PO_3M$, —$PO_3M$, or mixtures thereof; M is hydrogen or a water-soluble cation, the index f is an integer from 1 to 6, the index e is an integer from 0 to 6, m is an integer from 0 to 25; $R^1$ is a sulphonate group; $R^2$ is an amino group; [CAP] is a chain capping unit selected from
  i) hydrogen;
  ii) an aryl unit having the formula:

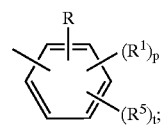

iii) an aryl unit having the formula:

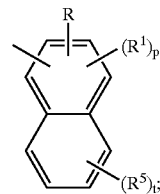

iv) an aryl unit having the formula:

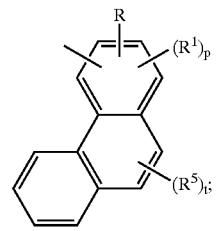

v) an aryl unit having the formula:

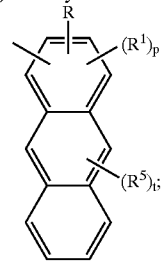

vi) and mixtures thereof;
$R^5$ is hydrogen, —$CH_2OH$, —$CH_2OSO_3M$, —$CH_3$, and mixtures thereof; the index n has an average value of from 8 to 25; the index p is 0 or 1; the index q is 0 or 1; the index t is 0 or 1

11 Claims, No Drawings

U.S. PATENT DOCUMENTS

| | | | |
|---|---|---|---|
| 3,412,022 A | * 11/1968 | Dardoufas et al. | 428/369 |
| 3,929,678 A | 12/1975 | Laughlin et al. | |
| 4,122,029 A | 10/1978 | Gee et al. | |
| 4,548,744 A | 10/1985 | Connor | |
| 4,551,506 A | 11/1985 | Gosselink | |
| 4,561,991 A | 12/1985 | Herbots et al. | |
| 4,565,647 A | 1/1986 | Llenado | |
| 4,597,898 A | 7/1986 | Vander Meer | |
| 4,622,378 A | 11/1986 | Gosselink | |
| 4,659,802 A | 4/1987 | Rubingh et al. | |
| 4,661,288 A | 4/1987 | Rubingh et al. | |
| 4,664,848 A | 5/1987 | Oh et al. | |
| 4,676,921 A | 6/1987 | Vander Meer | |
| 4,891,160 A | 1/1990 | Vander Meer | |
| 4,898,685 A | * 2/1990 | Kanekiyo et al. | 516/66 |
| 5,075,041 A | 12/1991 | Lutz | |
| 5,349,101 A | 9/1994 | Lutz et al. | |
| 5,389,277 A | 2/1995 | Prieto | |
| 5,454,982 A | 10/1995 | Murch et al. | |
| 5,489,393 A | 2/1996 | Connor et al. | |
| 5,536,445 A | 7/1996 | Campbell et al. | |
| 5,565,145 A | 10/1996 | Watson et al. | |
| 5,580,704 A | 12/1996 | Yoshida et al. | |
| 5,643,498 A | 7/1997 | Li et al. | |
| 5,858,948 A | 1/1999 | Ghosh et al. | |
| 5,912,221 A | 6/1999 | Van Leeuwen et al. | |
| 5,916,862 A | 6/1999 | Morelli et al. | |
| 5,929,270 A | * 7/1999 | Huglin et al. | 558/413 |
| 5,968,893 A | 10/1999 | Manohar et al. | |
| 6,004,922 A | 12/1999 | Watson et al. | |
| 6,057,278 A | 5/2000 | Gosselink et al. | |
| 6,066,612 A | 5/2000 | Murata et al. | |
| 6,071,871 A | 6/2000 | Gosselink et al. | |
| 6,075,000 A | 6/2000 | Rohrbaugh et al. | |
| 6,087,316 A | 7/2000 | Watson et al. | |
| 6,121,226 A | 9/2000 | Gosselink et al. | |
| 6,187,731 B1 | * 2/2001 | Moeller et al. | 510/219 |
| 6,288,015 B1 | * 9/2001 | Moeller et al. | 510/180 |
| 6,362,154 B1 | * 3/2002 | Moeller et al. | 510/417 |

* cited by examiner

OLIGOMERIC HYDROPHOBIC DISPERSANTS AND LAUNDRY DETERGENT COMPOSITIONS COMPRISING OLIGOMERIC DISPERSANTS

CROSS-REFERENCES TO RELATED APPLICATIONS

This application claims priority under 35 U.S.C. § 119(e) to U.S. Provisional Application Ser. No. 60/347,753 filed Jan. 11, 2002, U.S. Provisional Application Ser. No. 60/328,544 filed Oct. 11, 2001, and U.S. Provisional Application Ser. No. 60/311,882, filed Aug. 13, 2001.

FIELD OF THE INVENTION

The present invention relates to oligomeric soil dispersants which are the condensation product of formaldehyde and one or more arylenesulphonates. The present invention further relates to laundry detergent compositions comprising an aryl sulphonate-formaldehyde condensate oligomeric dispersant.

BACKGROUND OF THE INVENTION

Laundry detergent compositions comprise surfactants, however it has been found the direct action of surfactants does not provide the most effective cleaning. Other adjunct ingredients, inter alia, chelants, builders, and dispersants are necessary to obtain the maximal efficiency and effectiveness of a surfactant system. In addition, formulation requirements must be considered, for example, liquid laundry detergents require ingredients which are compatible in maintaining the composition as a stable, flowable liquid. Formulators of liquid laundry detergent compositions have necessarily adjusted the surfactant systems of said compositions in tandem with other adjunct ingredients to meet this requirement that the composition remain a stable, flowable liquid.

As stated above, key to the effectiveness of surfactant containing compositions, for example, as in the case of liquid detergents, is the ability of other adjunct ingredients to aid the surfactant system in removing soils from fabric. Of particular importance to laundry detergent compositions effectiveness are soil dispersants. In general, there are two types of soils; hydrophilic, inter alia, clay, and hydrophobic, inter alia, grease, oil. Dual-purpose dispersants, which may be effective in dispersing both types of soils, may be formulatable in granular compositions, but in liquids embodiments, the type and amount of dispersant is limited. To overcome the requirements of limited amount and physical properties, the ethoxylated polyalkyleneimine dispersants were developed. However, especially as it relates to hydrophobic soils and depending upon the composition of the surfactant system, an admixture of ethoxylated polyalkyleneimine dispersants may be required to obtain suitable suspension of oily, greasy dirt.

There is therefore a long felt need in the art for a hydrophobic dispersant which can be used in combination with all liquid laundry detergent surfactant systems.

SUMMARY OF THE INVENTION

The present invention meets the aforementioned needs in that it has been surprisingly discovered that certain aryl sulphonic acid/formaldehyde condensates provide increased hydrophobic soil dispersancy and are compatible with all laundry detergent surfactant systems, in one embodiment, liquid laundry detergent compositions.

The first aspect of the present invention relates to novel hydrophobic soil dispersants having the formula:

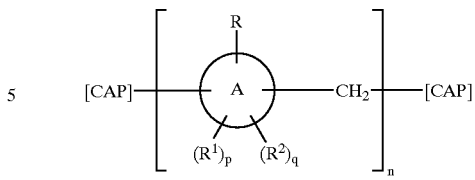

wherein A units are arylene units, one of which is phenyl, anthryl, or phenanthryl; each R is independently hydrogen, linear or branched $C_1$–$C_4$ alkyl, —$O(R^3O)_mR^4$, and mixtures thereof; $R^3$ is $C_2$–$C_4$ linear or branched alkylene, $R^4$ is hydrogen, $C_1$–$C_4$ alkyl, phenyl, phenyl sulphonate, —$CH_2CH(SO_3M)CH_2OH$, —$CH_2CH(OH)CH_2SO_3M$, —$(CH_2)_eSO_3M$, —$(CH_2)_fCO_2M$, —$(CH_2)_eCH(SO_3M)$-$CH_2SO_3M$, —$(CH_2)_eCH(SO_2M)$-$CH_2SO_3M$, —$(CH_2)_f PO_3M$, —$PO_3M$, or mixtures thereof; M is hydrogen or a water-soluble cation, the index f is an integer from 1 to 6, the index e is an integer from 0 to 6, the index m is an integer from 0 to 25; $R^1$ is a sulphonate group; $R^2$ is an amino group; [CAP] is a chain capping unit selected from i) hydrogen;
ii) an aryl unit having the formula:

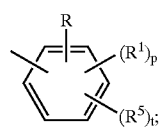

iii) an aryl unit having the formula:

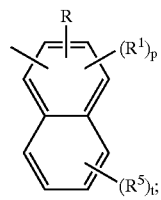

iv) an aryl unit having the formula:

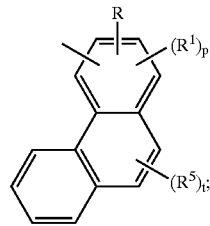

v) an aryl unit having the formula:

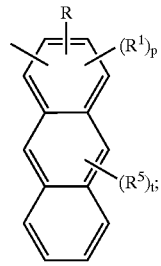

vi) and mixtures thereof;

$R^5$ is hydrogen, —$CH_2OH$, —$CH_2OSO_3M$, —$CH_3$, and mixtures thereof; the index n has an average value of from 3 to 150; the index p is 0 or 1; the index q is 0 or 1; the index t is 0 or 1.

Another aspect of the present invention relates to laundry detergent compositions comprising:

a) from about 0.1% to about 10% by weight, of a hydrophobic soil dispersant having the formula:

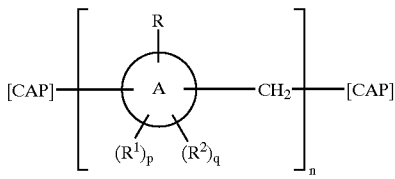

wherein A units are arylene units selected from the group consisting of phenyl, naphthyl, anthryl, phenanthryl, and mixtures thereof; each R is independently hydrogen, linear or branched $C_1$–$C_4$ alkyl, —$O(R^3O)_mR^4$, and mixtures thereof; $R^3$ is $C_2$–$C_4$ linear or branched alkylene, $R^4$ is hydrogen, $C_1$–$C_4$ alkyl, phenyl, phenyl sulphonate, —$CH_2CH(SO_3M)$ $CH_2OH$, —$CH_2CH(OH)CH_2SO_3M$, —$(CH_2)_e$ $SO_3M$, —$(CH_2)_fCO_2M$, —$(CH_2)_eCH(SO_3M)$-$CH_2SO_3M$, —$(CH_2)_eCH(SO_2M)$-$CH_2SO_3M$, —$(CH_2)_fPO_3M$, —$PO_3M$, or mixtures thereof; M is hydrogen or a water-soluble cation, the index f is an integer from 1 to 6, the index e is an integer from 0 to 6, the index m is an integer from 0 to 25; $R^1$ is a sulphonate group; $R^2$ is an amino group; [CAP] is a chain capping unit;

b) from about 10% to about 80% by weight, of a surfactant system; and c) the balance carriers and other adjunct ingredients.

These and other objects, features, and advantages will become apparent to those of ordinary skill in the art from a reading of the following detailed description and the appended claims. All percentages, ratios and proportions herein are by weight, unless otherwise specified. All temperatures are in degrees Celsius (° C.) unless otherwise specified. All documents cited are in relevant part, incorporated herein by reference.

DETAILED DESCRIPTION OF THE INVENTION

The present invention relates to novel compositions of matter which are useful as hydrophobic soil dispersants. The present invention also relates to liquid laundry detergent compositions which comprise a hydrophobic soil dispersant which is the condensation product of an aryl sulphonic acid and formaldehyde.

Liquid laundry detergents have the requirement that the compositions are stable, flowable liquids. To this end, surfactant systems, enzyme delivery systems, builders, and the like have been developed which are compatible with a broad range of liquid detergent surfactant systems. In addition, soil dispersants have been developed which can be formulated into liquid laundry compositions. The classes of the preferred liquid laundry detergent dispersants have been divided along the lines of soil type; hydrophilic and hydrophobic.

Many of these preferred dispersants are alkoxylated polyalkyleneimine having a wide range of molecular weight and degree of alkoxylation depending upon the specific properties which are desired. The required modifications to obtain suitable alkoxylated polyalkyleneimines are well described in the prior art. For example, U.S. Pat. No. 5,565,145 Watson et al., issued Oct. 15, 1996, included herein by reference, discloses hydrophobic (grease, oil) dispersants whereas U.S. Pat. No. 4,597,898 Vander Meer issued Jul. 1, 1986, also included herein by reference, discloses hydrophilic soil (clay) dispersants. Other disclosures relating to polyamine dispersants can be found in U.S. Pat. No. 4,548,744 Connor, issued Oct. 22, 1985; U.S. Pat. No. 4,561,991 Herbots et al., issued Dec. 31, 1985; U.S. Pat. No. 4,551,506 Gosselink, issued Nov. 5, 1986; U.S. Pat. No. 4,622,378 Gosselink, issued Nov. 11, 1986; U.S. Pat. No. 4,664,848 Oh et al., issued May 12, 1987; U.S. Pat. No. 4,659,802 Rubingh et al., issued Apr. 21, 1987; U.S. Pat. No. 4,661,288 Rubingh et al., issued Apr. 28, 1987; U.S. Pat. No. 4,676,921 Vander Meer, issued Jun. 30, 1987; U.S. Pat. No. 4,891,160 Vander Meer, issued Jan. 2, 1990; U.S. Pat. No. 5,858,948 Ghosh et al., issued Jan. 12, 1999; U.S. Pat. No. 5,912,221 Van Leeuwen et al., issued Jun. 15, 1999; U.S. Pat. No. 5,968,893 Manohar et al., issued Oct. 19, 1999; U.S. Pat. No. 6,004,922 Watson et al., issued Dec. 21, 1999; U.S. Pat. No. 6,057,278 Gosselink et al., issued May 2, 2000; U.S. Pat. No. 6,066,612 Murata et al., issued May 23, 2000; U.S. Pat. No. 6,071,871 Gosselink et al., issued Jun. 6, 2000; U.S. Pat. No. 6,075,000 Rohrbaugh et al., issued Jun. 13, 2000 U.S. Pat. No. 6,087,316 Watson et al., issued Jul. 11, 2000; U.S. Pat. No. 6,121,226 Gosselink et al., issued Sep. 19, 2000; all of which are incorporated herein by reference.

The present invention relates to the surprising discovery that a dispersant which is not based on a polyamine backbone or any degree of ethoxylation, can be used in liquid laundry detergent compositions as a hydrophobic dispersant. In addition, the dispersants of the present invention are highly compatible with polyalkyleneoxy substituted and unsubstituted polyalkyleneimine dispersants. In fact, one aspect of the present invention relates to compositions which comprise a dispersant system which is an admixture of an aryl sulphonic acid/formaldehyde condensate dispersant and one or more polyalkyleneimine based dispersants.

Aryl Sulphonic Acid/Formaldehyde Condensates

The novel hydrophobic dispersants of the present invention have the formula:

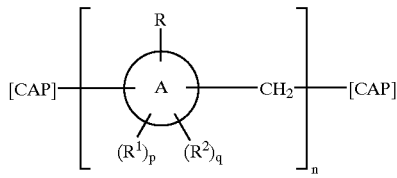

wherein A represents one or more arylene units provided at least one of said arylene units is phenyl, anthryl, or phenanthryl.

For the purposes of the present invention the term "arylene unit" is defined herein as "a substituted or unsubstituted aromatic radical consisting of one to three rings" said units selected from the group consisting of phenyl, naphthyl, anthryl, phenanthryl, and mixtures thereof. The A units of the present invention are linked by methylene units which can be bonded to any carbon atom of the arylene unit. When substituted by non-hydrogen atom R units, $R^1$ units, $R^2$ units, and non-hydrogen atom $R^5$ units, the substitution may occur at any ring position.

For example, a residue having the formula:

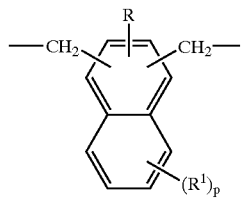

stands equally well for both the units:

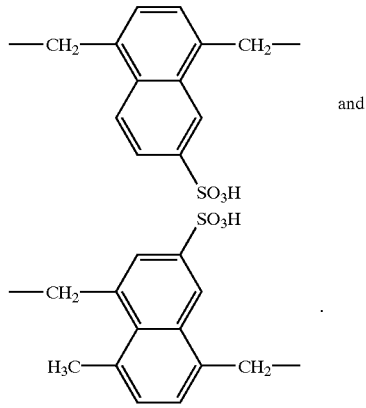

One embodiment of the novel dispersants relates to the combination of phenyl and naphthyl comprising units. Another embodiment relates to the combination of naphthyl and anthryl units to form an oligomeric or polymeric condensate. Any combination or arylene units may comprise the dispersants, provided at least one residue comprises a phenyl, anthryl, or phenanthryl unit.

Each R is independently hydrogen, linear or branched $C_1$-$C_4$ alkyl, —O($R^3$O)$_m$$R^4$, and mixtures thereof. In one embodiment of the present invention, each R unit is hydrogen. One embodiment of this aspect of the invention relates to dispersants which are the condensation product of an admixture of phenyl sulphonic acid and naphthylene sulphonic acid with formaldehyde. Another embodiment of this aspect relates to the condensation product of naphthylene sulphonic acid and anthracene sulphonic acid with formaldehyde. In another aspect, R is methyl wherein the phenyl-type A rings are derived from toluene sulphonic acid while R is hydrogen for the naphthyl ring component.

In one embodiment, wherein —O($R^3$O)$_m$$R^4$ units are present, $R^4$ is hydrogen and the index m is 0 resulting in one or more R units which are —OH. Another aspect of R units which are —O($R^3$O)$_m$$R^4$ units relates to alkyleneoxy units which are capable of enhancing the dispersibility or water solubility of the dispersants. One embodiment relates to $R^3$ units which are entirely comprised of ethylene units capped with a $R^4$ unit equal to hydrogen, whereas another embodiment relates to $R^3$ units which are an admixture of ethylene and 2-propylene units also capped with a $R^4$ unit which is hydrogen. However, each of these embodiments can be modified to be have $R^4$ units which are alkyl, for example, methyl, ethyl, and the like. Sources of these alkyleneoxy R units can be polyethylene glycols (PEG's), methoxy polyethylene glycols (MPEG's), or Pluronics® which are block copolymers of ethyleneoxy and propyleneoxy units available ex BASF. In one aspect of the present invention, as described herein below, $R^4$ units may comprise a sulphonate unit.

One embodiment of the present invention relates to phenyl ether units wherein the index m is equal to 0 and $R^4$ is phenyl. For this embodiment, the formulator may sulphonate or substitute either of the aromatic rings, for example, an aryl unit having the formula:

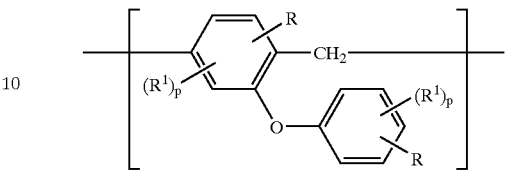

$R^1$ units are sulphonate groups having the formula —$SO_3$M wherein M is hydrogen, a water-soluble cation, and mixtures thereof. The index p is 0 or 1. When p is 0 no sulphonate group is present on the corresponding arylene unit. When p is equal to 1, at least one sulphonate group is present. According to the present invention, sulphonate groups may be present at more than one position on the aromatic ring or rings. Non-limiting examples of water-soluble cations include lithium, sodium, potassium, ammonium, and the like. For the purposes of the present invention, when an arylene unit is sulphonated during the preparation of the dispersants of the present invention, incomplete sulphonation or substituent group sulphonation may occur.

One aspect of the present invention relates to dispersants comprising only arylene sulphonate groups, for example, only —$SO_3$M units attached to an aromatic ring as in the formulae:

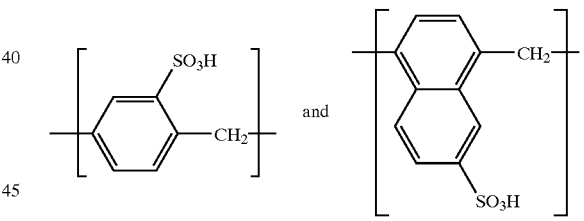

However, depending upon the units which comprise the dispersants of the present invention and the condition under which sulphonation reactions are conducted, —$SO_3$M units not directly attached to the aromatic ring may be present. This is may be especially true when unreacted phenol units are present as in the case wherein the formulator has converted —OH units into alkyleneoxy units. Examples of non-arylene sulphation products include units having the formulae:

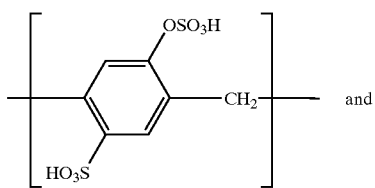 and

-continued

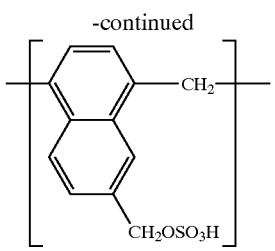

For the purposes of the present invention, the presence and inclusion of these units are regarded as an aspect of the present invention unless their presence in the backbone of the resulting compounds pejoratively affects the dispersant properties of the oligomeric or polymeric admixture.

$R^2$ units are amino units. The amino units may be primary, secondary, tertiary, or quaternary amino units. The index q is 0 or 1. When q is 0 no amino unit is present. When q is equal to 1, at least one amino group is present. According to the present invention, amino groups may be present at more than one position on the aromatic ring, or rings. One aspect of the present invention relates only to the presence of primary amino units, an example of which includes dispersants comprising units having the formula:

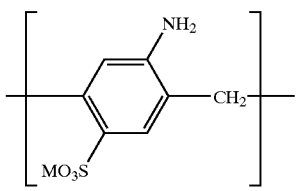

which can be derived from 4-amino phenylsulphonate (sulphanilic acid).

[CAP] represents a capping unit which truncates, terminates, or otherwise ends an oligomer chain. Those of ordinary skill in the art recognize the form of [CAP] units may result from the synthetic procedure used to form the oligomer, for example, excess reagent or impurities which are present in the starting material. The formulator may substitute any [CAP] unit compatible with the properties of the desired final dispersant, in one embodiment of the present invention, the [CAP] unit is a hydrogen indicating no further reaction.

Although the [CAP] unit may comprise any compatible moiety, in one aspect of the present invention, [CAP] is a chain capping unit selected from i) hydrogen;

ii) an aryl unit having the formula:

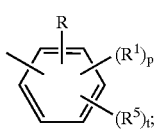

iii) an aryl unit having the formula:

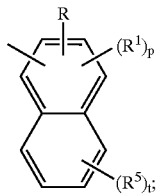

iv) an aryl unit having the formula:

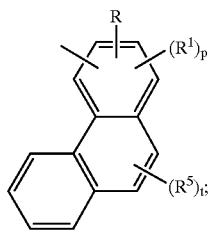

v) an aryl unit having the formula:

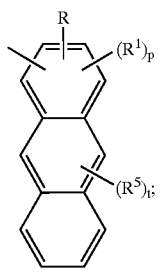

vi) and mixtures thereof;

wherein $R^5$ is hydrogen, —$CH_2OH$, —$CH_2OSO_3M$, —$CH_3$, and mixtures thereof; the index t is 0 or 1.

The index n has an average value of from 3 to 150. One embodiment of the present invention relates to oligomers having an index n from about 8 to about 25. The formulator will recognize that oligomers which comprise a large proportion of phenanthryl and anthryl arylene units will have a higher corresponding molecular weight per value of n. Oligomers having values of n greater than about 50 will comprise embodiments having a large proportion of phenyl and/or naphthyl arylene units. However, any oligomer that is water-soluble or water-dispersible and capable of providing the properties of soil dispersancy, regardless of the value of n from 3 to 150, is encompassed by the present invention.

One aspect of the present invention comprises n from 8 to 15, while another aspect comprises n values from 15 to 50. One embodiment of the broadest range of n values relates to oligomers wherein n is from 3 to 50.

One aspect of the present invention relates to dispersants having the formula:

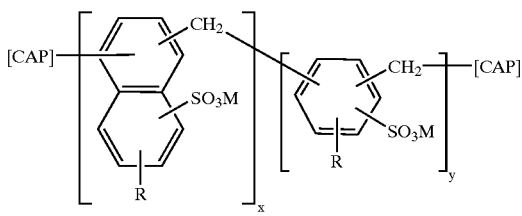
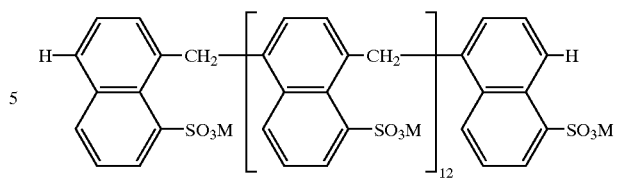

which are formed from an admixture of phenyl and naphthyl sulphonic acids. In one embodiment of this aspect, the index x is from 1 to 150 and the index y is from 1 to 150. In another embodiment of this aspect, the index x is from 3 to 18 and the index y is 1.

EXAMPLE 1

To a 1000 mL flask is charged 10 parts of toluene and 190 parts of naphthalene. To this admixture under argon blanketing is added slowly 150 parts of 100% sulfuric acid. The temperature after addition is raised to about 110° C. and stirred for several hours. The solution is cooled to about 60° C. and 50 parts of a 37% aqueous solution of formaldehyde is added while maintaining the reaction temperature at about RT. To the slurry is added about 25 parts water and the solution heated to near reflux for several hours. The reaction mixture is transferred while still warm to a slurry of ice and neutralized with $Na_2CO_3$. The solution is evaporated to dryness and the product isolated from the water soluble organic salts.

The present invention further relates to liquid laundry detergent compositions comprising a dispersant having the formula:

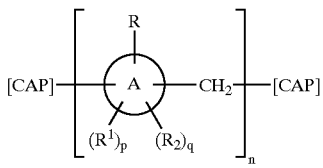

wherein A units are arylene units selected from the group consisting of phenyl, naphthyl, anthryl, phenanthryl, and mixtures thereof; each R is independently hydrogen, linear or branched $C_1$–$C_4$ alkyl, —O($R^3O)_mR^4$, and mixtures thereof; $R^3$ is $C_2$–$C_4$ linear or branched alkylene, $R^4$ is hydrogen, $C_1$–$C_4$ alkyl, —$SO_3M$, phenyl, phenyl sulphonate, —$CH_2CH(SO_3M)CH_2OH$, —$CH_2CH(OH)CH_2SO_3M$, —$(CH_2)_eSO_3M$, —$(CH_2)_fCO_2M$, —$(CH_2)_eCH(SO_3M)$-$CH_2SO_3M$, —$(CH_2)_eCH(SO_2M)$-$CH_2SO_3M$, —$(CH_2)_fPO_3M$, —$PO_3M$, or mixtures thereof; M is hydrogen or a water-soluble cation, the index f is an integer from 1 to 6, the index e is an integer from 0 to 6, M is hydrogen or a water-soluble cation, m is an integer from 0 to 25; $R^1$ is a sulphonate group; $R^2$ is an amino group; [CAP] is a chain capping unit as defined herein above; the index n has an average value of from about 3 to about 150.

The following is a non-limiting example of a polymer or oligomer according to the present invention which is suitable for use in the laundry detergent compositions and which comprises naphthalene sulphonic acid residues.

Examples of these polymers or oligomers include Daxad 11®, Daxad 11G®, and KLS® ex W. R. Grace; Blancol N® ex Rhone Poulene Surfactants; Harol KG® ex Graden Chemical Co.; Lomar LS® ex Henkel Corp.; Petro Dispersant 425® ex Witco Corp.; and Tamal® ex Rohm & Haas Co.

Formulations

The hydrophobic soil dispersants of the present invention are suitable for use in any laundry detergent matrix, for example, granular, paste, agglomerates, liquids, and the like.

One aspect of the present invention relates to liquid laundry detergent compositions which provide a stable, flowable liquid matrix. One aspect of the present invention relates to compositions comprising:

a) from about 0.1% to about 10% by weight, of a hydrophobic dispersant according to the present invention;

b) from about 10% by weight, in one embodiment from about 10% to about 80% by weight, in yet another embodiment from about 10% to about 60%, wherein another embodiment comprises from about 15% to about 30% by weight, of a surfactant system, said surfactant system comprising:

i) from 0.01%, whereas depending upon which aspect or embodiment of the present invention, the following ranges are suitable: from about 0.1% to about 100%; from about 1% to about 80%; from about 1% to about 60%, from about 1% to about 30% by weight, of one or more anionic surfactants, said anionic surfactants selected form the group consisting of linear alkyl benzene sulphonates, mid-chain branched alkyl benzene sulphonates; linear alkyl sulfates, mid-chain branched sulfates, linear alkyleneoxy sulfates, mid-chain branched alkyleneoxy sulfates; and mixtures thereof;

ii) optionally, from 0.01%, whereas depending upon which aspect or embodiment of the present invention, the following ranges are suitable: from about 0.1% to about 100%; from about 1% to about 80%; from about 1% to about 60%, from about 1% to about 30% by weight, of one or more nonionic surfactants selected from the group consisting of alcohols, alcohol ethoxylates, polyoxyalkylene alkylamides, and mixtures thereof; and c) the balance carriers and other adjunct ingredients.

When the liquid detergent compositions of the present invention are used, the pH of the resulting aqueous solution, upon dilution, will have a value of from about 7 to about 8.5. One embodiment of the present invention has a wash water pH during use of about 8.

Formulations according to the present invention may comprise a dispersant system which comprises one or more dispersants, said system including one or more hydrophobic soil dispersants according to the present invention. Said mixed dispersant compositions comprise:

a) from about 0.1% to about 10% by weight, of said detergent composition, a soil dispersant system, said system comprising:

i) from about 1% to about 100% by weight, an aryl sulphonate formaldehyde condensate hydrophobic soil dispersant according to the present invention;
ii) optionally, from about 1% to about 99% by weight, of a second hydrophobic soil dispersant;
iii) optionally, from about 1% to about 99% by weight, of one or more hydrophilic soil dispersants;

b) from about 10% by weight, in one embodiment from about 10% to about 80% by weight, in yet another embodiment from about 10% to about 60%, wherein another embodiment comprises from about 15% to about 30% by weight, of a surfactant system according to the present invention; and c) the balance carriers and other adjunct ingredients.

One embodiment of this aspect of the present invention comprises:

a) from about 1% to about 5% by weight, of said liquid laundry detergent composition, a soil dispersant system, said dispersant system comprising:
i) from about 50% to about 80% by weight, an aryl sulphonate formaldehyde condensate hydrophobic soil dispersant according to the present invention;
ii) from about 20% to about 50% by weight, of a hydrophobic soil dispersant having the formula:

wherein R is $C_2$–$C_3$ linear or branched alkylene, E is an alkyleneoxy unit having the formula:

$R^1$ is linear or branched $C_2$–$C_4$ alkylene, k has an average value from 11 to 50; B is a continuation of the backbone by branching; the indices m and n have values such as the molecular weight of the polyalkyleneimine backbone is from about 600 to about 2000; and iii) optionally, from about 1% to about 99% by weight, of a hydrophilic soil dispersant having the formula:

wherein R is ethylene, E is an alkyleneoxy unit having the formula:

$R^1$ is ethylene; k has an average value from 15 to 18; B is a continuation of the backbone by branching; m is from 0 to 3; n is from 0 to 3.

Another suitable dispersant for use in the dispersant systems of the present invention includes a polyalkyleneimine having the formula:

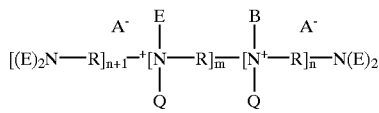

wherein R is $C_2$–$C_3$ linear or branched alkylene, E is an alkyleneoxy unit having the formula:

$R^1$ is ethylene, $R^2$ is hydrogen, an anionic unit, and mixtures thereof; and mixtures thereof; k has an average value from 1 to 50; Q is $C_1$–$C_{22}$ alkyl, benzyl, and mixtures thereof; B is a continuation of the backbone by branching; the indices m and n have values such as the molecular weight of the polyalkyleneimine backbone prior to ethoxylation and quaternization is from about 60 to about 600; A is a water soluble anion.

Another embodiment of the present invention relates to compositions which comprise a zwitterionic dispersant having the formula:

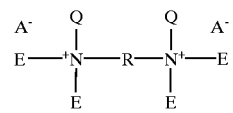

wherein R is $C_4$–$C_{12}$ alkylene or a unit having the formula:

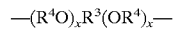

wherein $R^3$ is $C_2$–$C_6$ alkylene, $R^4$ is $C_3$–$C_6$ alkylene; and x is from 2 to 6; E is an alkyleneoxy unit having the formula:

$R^1$ is ethylene, $R^2$ is hydrogen, an anionic unit, and mixtures thereof; and mixtures thereof; k has an average value from 1 to 50; Q is $C_1$–$C_{22}$ alkyl, benzyl, and mixtures thereof. One example of said dispersants comprises a mixture or quaternized diamines wherein each has R equal to hexamethylene, Q equal to methyl and wherein from about 35% to about 70% of said $R^2$ units in the admixture are —$SO_3H$, and the value of k averages about 24.

Surfactant System

The laundry detergent compositions of the present invention comprise a surfactant system. The surfactant systems of the present invention may comprise any type of detersive surfactant, non-limiting examples of which include one or more mid-chain branched alkyl sulfate surfactants, one or more mid-chain branched alkyl alkoxy sulfate surfactants, one or more mid-chain branched aryl sulphonate surfactants, one or more non mid-chain branched sulphonates, sulphates, cationic surfactants, zwitterionic surfactants, ampholytic surfactants, and mixtures thereof.

The total amount of surfactant present in the compositions of the present invention is from about 10% by weight, in one embodiment of the present invention the range of surfactant is from about 10% to about 80% by weight, of said composition. Another embodiment the amount of surfactant is from about 10% to about 60%, wherein another embodiment comprises from about 15% to about 30% by weight, of said composition.

Nonlimiting examples of surfactants useful herein include:
a) $C_{11}$–$C_{18}$ alkyl benzene sulphonates (LAS);
b) $C_6$–$C_{18}$ mid-chain branched aryl sulphonates (BLAS);
c) $C_{10}$–$C_{20}$ primary, (α or ω-branched, and random alkyl sulfates (AS);
d) $C_{14}$–$C_{20}$ mid-chain branched alkyl sulfates (BAS);
e) $C_{10}$–$C_{18}$ secondary (2,3) alkyl sulfates as described in U.S. Pat. No. 3,234,258 Morris, issued Feb. 8, 1966; U.S. Pat. No. 5,075,041 Lutz, issued Dec. 24, 1991; U.S. Pat. No. 5,349,101 Lutz et al., issued Sep. 20, 1994; and U.S. Pat. No. 5,389,277 Prieto, issued Feb. 14, 1995 each incorporated herein by reference;

f) $C_{10}$–$C_{18}$ alkyl alkoxy sulfates (AE$_x$S) wherein preferably x is from 1–7;

g) $C_{14}$–$C_{20}$ mid-chain branched alkyl alkoxy sulfates (BAE$_x$S);

h) $C_{10}$–$C_{18}$ alkyl alkoxy carboxylates preferably comprising 1–5 ethoxy units;

i) $C_{12}$–$C_{18}$ alkyl ethoxylates, $C_6$–$C_{12}$ alkyl phenol alkoxylates wherein the alkoxylate units are a mixture of ethyleneoxy and propyleneoxy units, $C_{12}$–$C_{18}$ alcohol and $C_6$–$C_{12}$ alkyl phenol condensates with ethylene oxide/propylene oxide block polymers inter alia Pluronic® ex BASF which are disclosed in U.S. Pat. No. 3,929,678 Laughlin et al., issued Dec. 30, 1975, incorporated herein by reference;

j) $C_{14}$–$C_{22}$ mid-chain branched alkyl alkoxylates, BAE$_x$;

k) Alkylpolysaccharides as disclosed in U.S. Pat. No. 4,565,647 Llenado, issued Jan. 26, 1986, incorporated herein by reference;

l) Pseudoquat surfactants having the formula:

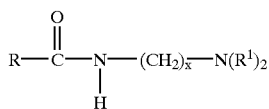

wherein R is $C_4$–$C_{10}$ alkyl, $R^1$ is selected from the group consisting of $C_1$–$C_4$ alkyl, —$(CH_2CHR^2O)_yH$, and mixtures thereof; $R^2$ is hydrogen, ethyl, methyl, and mixtures thereof; y is from 1 to 5; x is from 2 to 4; for the purposes of the present invention, a particularly useful pseudoquat surfactant comprises R equal to an admixture of $C_8$–$C_{10}$ alkyl, $R^1$ is equal to methyl; and x equal to 3; these surfactants are described in U.S. Pat. No. 5,916,862 Morelli et al., issued Jun. 29, 1999 included herein by reference;

m) Polyhydroxy fatty acid amides having the formula:

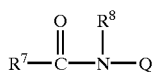

wherein $R^7$ is $C_5$–$C_{31}$ alkyl; $R^8$ is selected from the group consisting of hydrogen, $C_1$–$C_4$ alkyl, $C_1$–$C_4$ hydroxyalkyl, Q is a polyhydroxyalkyl moiety having a linear alkyl chain with at least 3 hydroxyls directly connected to the chain, or an alkoxylated derivative thereof; preferred alkoxy is ethoxy or propoxy, and mixtures thereof. These surfactants are described in U.S. Pat. No. 5,489,393 Connor et al., issued Feb. 6, 1996; and U.S. Pat. No. 5,45,982 Murch et al., issued Oct. 3, 1995, both incorporated herein by reference.

The mid-chain branched alkyl sulfate surfactants of the present invention have the formula:

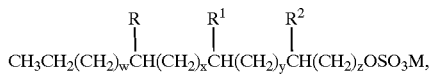

the alkyl alkoxy sulfates have the formula:

the alkyl alkoxylates have the formula:

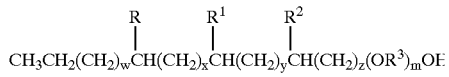

wherein R, $R^1$, and $R^2$ are each independently hydrogen, $C_1$–$C_3$ alkyl, and mixtures thereof; provided at least one of R, $R^1$, and $R^2$ is not hydrogen; preferably R, $R^1$, and $R^2$ are methyl; preferably one of R, $R^1$, and $R^2$ is methyl and the other units are hydrogen. The total number of carbon atoms in the mid-chain branched alkyl sulfate and alkyl alkoxy sulfate surfactants is from 14 to 20; the index w is an integer from 0 to 13; x is an integer from 0 to 13; y is an integer from 0 to 13; z is an integer of at least 1; provided w+x+y+z is from 8 to 14 and the total number of carbon atoms in a surfactant is from 14 to 20; $R^3$ is $C_1$–$C_4$ linear or branched alkylene, preferably ethylene, 1,2-propylene, 1,3-propylene, 1,2-butylene, 1,4-butylene, and mixtures thereof.

M denotes a cation, preferably hydrogen, a water soluble cation, and mixtures thereof. Non-limiting examples of water soluble cations include sodium, potassium, lithium, ammonium, alkyl ammonium, and mixtures thereof.

Enzymes

Enzymes are a preferred adjunct ingredient of the present invention. The selection of enzymes is left to the formulator, however, the examples herein below illustrate the use of enzymes in the liquid laundry detergents of the present invention.

"Detersive enzyme", as used herein, means any enzyme having a cleaning, stain removing or otherwise beneficial effect in a liquid laundry, hard surface cleaning or personal care detergent composition. Preferred detersive enzymes are hydrolases such as proteases, amylases and lipases. Preferred enzymes for liquid laundry purposes include, but are not limited to, inter alia proteases, cellulases, lipases and peroxidases.

Protease Enzymes

The liquid laundry detergent compositions according to the present invention may further comprise at least 0.001% by weight, of a protease enzyme. However, an effective amount of protease enzyme is sufficient for use in the liquid laundry detergent compositions described herein. The term "an effective amount" refers to any amount capable of producing a cleaning, stain removal, soil removal, whitening, deodorizing, or freshness improving effect on substrates such as fabrics. In practical terms for current commercial preparations, typical amounts are up to about 5 mg by weight, more typically 0.01 mg to 3 mg, of active enzyme per gram of the detergent composition. Stated otherwise, the compositions herein will typically comprise from 0.001% to 5%, other embodiments will comprise 0.01%–1% by weight of a commercial enzyme preparation. The protease enzymes of the present invention are usually present in such commercial preparations at levels sufficient to provide from 0.005 to 0.1 Anson units (AU) of activity per gram of composition.

One embodiment of the liquid laundry detergent compositions of the present invention comprise modified protease enzymes derived from Bacillus amyloliquefaciens or Bacillus lentus as described in U.S. Pat. No. 5,679,630 Baeck et al., issued Oct. 21, 1997. In addition, a variant of Protease A(BPN') which is a non-naturally occurring carbonyl hydrolase variant having a different proteolytic activity, stability, substrate specificity, pH profile and/or performance characteristic as compared to the precursor carbonyl hydrolase from which the amino acid sequence of the variant is derived. This variant of BPN' is disclosed in EP 130,756 A, Jan. 9, 1985.

A further suitable protease enzyme is Protease B, a non-naturally occurring carbonyl hydrolase variant having a different proteolytic activity, stability, substrate specificity, pH profile and/or performance characteristic as compared to the precursor carbonyl hydrolase from which the amino acid sequence of the variant is derived. Protease B is a variant of BPN' in which tyrosine is replaced with leucine at position +217 and as further disclosed in EP 303,761 A, Apr. 28, 1987 and EP 130,756 A, Jan. 9, 1985. Also suitable are bleach stable variants of Protease B, specifically Protease B-BSV are variants wherein the Gly at position 166, 169, the Met at position 222 are replaced.

Another suitable protease enzyme for use in the compositions of the present invention Protease C, a variant of an alkaline serine protease from Bacillus in which lysine replaces arginine at position 27, tyrosine replaces valine at position 104, serine replaces asparagine at position 123, and alanine replaced threonine at position 274 as described in EP 90915958:4, corresponding to WO 91/06637, Published May 16, 1991.

Another suitable protease enzyme is Protease D, a carbonyl hydrolase variant derived from Bacillus lentus subtilisin having an amino acid sequence not found in nature, which is derived from a precursor carbonyl hydrolase by substituting a different amino acid for a plurality of amino acid residues as described in WO 95/10615 published Apr. 20, 1995 by Genencor International.

Suitable enzymes are disclosed in WO 9203529 A, WO 9510591, WO and WO 9425583, WO 99/20723, WO 99/20726, WO 99/20727, EP 251 446, WO 91/06637, WO91/02792, WO 95/23221, WO 93/18140 A, WO 92/03529 A, WO 95/07791, WO 94/25583 and EP 516 200.

Commercially available proteases useful in the present invention are ALCALASE®, DURAZYM®, SAVINASE®, EVERLASE® and KANNASE®, and ESPERASE® ex Novo and MAXATASE®, MAXACAL®, PROPERASE® and MAXAPEM® ex Genencor.

In addition to proteases, amylase enzymes, non-limiting examples of which are RAPIDASE®, TERMAMYL®, FUNGAMYL®, and DURAMYL® are suitable for use in the compositions of the present invention.

In addition to proteases, cellulase enzymes, non-limiting examples of which are disclosed in U.S. Pat. No. 4,435,307 Barbesgoard et al, issued Mar. 6, 1984 GB-A-2.075.028; GB-A-2.095.275 and DE-OS-2.247.832 are suitable for use in the compositions of the present invention.

In addition lipase enzymes are suitable for use in the compositions of the present invention. Non-limiting examples of lipase enzymes are disclosed in GB 1,372,034, Lipase P Amano (Amano-P), Amano-CES, or lipases ex Chromobacter viscosum, e.g. Chromobacter viscosum var. lipolyticum NRRLB 3673 from Toyo Jozo Co., Tagata, Japan; Chromobacter viscosum lipases from U.S. Biochemical Corp., U.S.A. and Disoynth Co., The Netherlands, and lipases ex Pseudomonas gladioli. LIPOLASE® enzyme derived from Humicola lanuginosa and commercially available from Novo, see also EP 341,947, is a preferred lipase for use herein. Lipase and amylase variants stabilized against peroxidase enzymes are described in WO 9414951 A to Novo. See also WO 9205249 and RD 94359044.

Cutinase enzymes suitable for use herein are described in WO 8809367 A to Genencor.

Peroxidase enzymes may be used in combination with oxygen sources, e.g., percarbonate, perborate, hydrogen peroxide, etc., for "solution bleaching" or prevention of transfer of dyes or pigments removed from substrates during the wash to other substrates present in the wash solution. Known peroxidases include horseradish peroxidase, ligninase, and haloperoxidases such as chloro- or bromoperoxidase. Peroxidase-containing detergent compositions are disclosed in WO 89099813 A, Oct. 19, 1989 to Novo and WO 8909813 A to Novo.

Another suitable enzymes according to the present invention are mannanase enzymes. When present mannanase enzymes comprise from about 0.0001% to about 0.1%, however in one embodiment the enzymes comprise from 0.0005% to about 2%. Further aspects of the present invention relate to liquid laundry detergent compositions comprising about 0.001% to about 0.02% by weight, of mannanase enzyme in said composition.

The compositions of the present invention may also comprise a xyloglucanase enzyme. Suitable xyloglucanases for the purpose of the present invention are enzymes exhibiting endoglucanase activity specific for xyloglucan. The xyloglucanase is incorporated into the compositions of the invention at a level of from 0.0001% to 2% by weight, of said composition. Other embodiments comprise from 0.0005% to 0.1% while another embodiment comprises from 0.001% to 0.02% by weight, of pure enzyme.

The following disclose the use of suitable enzymes. U.S. Pat. No. 6,133,277 Barnabas et al., issued Oct. 17, 2000; U.S. Pat. No. 6,046,149 Sorrie et al., issued Apr. 4, 2000; U.S. Pat. No. 6,008,178 Baillely et al., issued Dec. 28, 1999; U.S. 5,935,271 Lappas et al., issued Aug. 10, 1999; U.S. Pat. No. 5,932,532 Ghosh et al., issued Aug. 3, 1999; U.S. Pat. No. 5,925,609 Baillely et al., issued Jul. 20, 1999; U.S. Pat. No. 5,919,272 Baillely et al., issued Jul. 6, 1999; U.S. Pat. No. 5,858,948 Ghosh et al., issued Jan. 12, 1999; U.S. Pat. No. 5,858,946 Foley et al., issued Jan. 12, 1999; U.S. Pat. No. 5,733,473 Johnston et al., issued Mar. 31, 1998 all of which are included herein by reference.

Enzyme Stabilizing System

The compositions, herein may comprise from about 0.001% to about 10% by weight, of an enzyme stabilizing system. One embodiment comprises from about 0.005% to about 8% by weight of said system, while another aspect includes the range from about 0.01% to about 6% by weight, of an enzyme stabilizing system. The enzyme stabilizing system can be any stabilizing system which is compatible with the detersive enzyme. Stabilizing systems can, for example, comprise calcium ion, boric acid, propylene glycol, short chain carboxylic acids, boronic acids, and mixtures thereof, and are designed to address different stabilization problems depending on the type and physical form of the detergent composition.

Stabilizing systems are disclosed in U.S. Pat. No. 4,537,706 Severson, issued Aug. 27, 1985 and U.S. Pat. No. 4,652,392 Baginski et al., issued Mar. 24, 1987.

Bleaching System

The laundry detergent compositions of the present invention may optionally include a bleaching system. Non-limiting examples of bleaching systems include hypohalite bleaches, peroxygen bleaching systems, or transition metal nil peroxygen systems. Peroxygen systems typically comprise a "bleaching agent" (source of hydrogen peroxide) and an "initiator" or "catalyst", however, pre-formed bleaching agents are included. Catalysts for peroxygen systems can include transition metal systems. In addition, certain transition metal complexes are capable of providing a bleaching system without the presence of a source of hydrogen peroxide.

Compositions of the present invention which contain a bleaching system, comprise:
a) from about 0.1% to about 10% by weight, of a hydrophobic dispersant according to the present invention;
b) from about 0.01% by weight, of a surfactant system. In one embodiment the compositions comprise from about 0.1% to about 60%, in another embodiment from about 1% to about 30% by weight, of a surfactant system. The surfactant systems of this aspect comprise:
  i) from 0.01%, in one embodiment from about 0.1% to about 100%, in another embodiment from about 1% to about 80% by weight, of one or more anionic surfactants. However, other embodiments comprise form 1% to about 60%, or in another embodiment to about 30% by weight, of one or more anionic surfactants, said anionic surfactants selected form the group consisting of linear alkyl benzene sulphonates, mid-chain branched alkyl benzene sulphonates; linear alkyl sulfates, mid-chain branched sulfates, linear alkyleneoxy sulfates, mid-chain branched alkyleneoxy sulfates; and mixtures thereof;
  ii) optionally, from 0.01% to about 99.99%, in one embodiment from about 0.1% to about 80% by weight, of a nonionic surfactant, while in another embodiment from about 1% to about 60%, or in another embodiment to about 30% by weight, of one or more nonionic surfactants selected from the group consisting of alcohols, alcohol ethoxylates, polyoxyalkylene alkylamides, and mixtures thereof;
c) from about 1%, or in another embodiment from about 5% to about 80%, however one embodiment comprises from about 1% to about 50% by weight, of a peroxygen bleaching system comprising:
  i) from about 40% by weight, of the bleaching system, a source of hydrogen peroxide;
  ii) optionally from about 0.1% by weight, of the beaching system, a beach activator;
  iii) optionally from about 1 ppb (0.0000001%) by weight of the composition, of a transition-metal bleach catalyst;
  iv) optionally from about 0.1% by weight, of a pre-formed peroxygen bleaching agent; and
d) the balance carriers and other adjunct ingredients.

One embodiment of the present invention may comprise 100% by weight, of nonionic surfactants as described hereinabove.

Other aspects comprise:
  i) from about 50% to about 99.9% by weight, of the bleaching system, a source of hydrogen peroxide; and
  ii) from about 0. 1% to about 50% by weight, of the beaching system, a beach activator.
  i) from about 60% to about 95% by weight, of the bleaching system, a source of hydrogen peroxide; and
  ii) from about 5% to about 40% by weight, of the beaching system, a beach activator.
  i) from about 60% to about 80% by weight, of the bleaching system, a source of hydrogen peroxide; and
  ii) from about 20% to about 40% by weight, of the beaching system, a beach activator.

Other aspects include the use of a metal bleach catalyst, for example, embodiments comprise:
  i) from 0.01% by weight, of a source of hydrogen peroxide; and
  iii) from about 100 ppb (0.00001%) to about 99.9% by weight of the composition, of a transition-metal bleach catalyst; or
  iii) from about 500 ppb (0.00005%) to about 50% by weight of the composition, of a transition-metal bleach catalyst; or
  iii) from about 1 ppm (0.0001%) to about 5%%) by weight of the composition, of a transition-metal bleach catalyst; or
  iii) from about 1 ppm (0.0001%) to about 500 ppm (0.05%) by weight of the composition, of a transition-metal bleach catalyst.

Bleaching Agents—Hydrogen peroxide sources are described in detail in the herein incorporated Kirk Othmer's Encyclopedia of Chemical Technology, 4th Ed (1992, John Wiley & Sons), Vol. 4, pp. 271–300 "Bleaching Agents (Survey)", and include the various forms of sodium perborate and sodium percarbonate, including various coated and modified forms.

Sources of hydrogen peroxide which are suitable for use in the compositions of the present invention include, but are not limited to, perborates, percarbonates, perphosphates, persulfates, and mixtures thereof. Preferred sources of hydrogen peroxide are sodium perborate monohydrate, sodium perborate tetrahydrate, sodium percarbonate and sodium persulfate, more preferably are sodium perborate monohydrate, sodium perborate tetrahydrate, and sodium percarbonate. When present the source of hydrogen peroxide is present at a level of from about 40%, preferably from about 50%, more preferably from about 60% to about 100%, preferably to about 95%, more preferably to about 80% by weight, of the bleaching system. Embodiments which are bleach comprising pre-soak compositions may comprise from 5% to 99% of the source of hydrogen peroxide.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with a silicate, borate or water-soluble surfactants.

Bleach Activators

Preferably, the source of hydrogen peroxide (peroxygen bleach component) in the composition is formulated with an activator (peracid precursor). The activator is present at levels of from about 0.01%, in one embodiment the activator is present from about 0.5% to about 15%, whereas another embodiment comprises from about 1% to about 10%. Other suitable embodiment comprises no more than to about 8%, by weight of the composition of a suitable activator. Also, bleach activators will comprise from about 0.1% to about 60% by weight, of the beaching system itself. Fore example, when the herein described bleaching system comprises 60% by weight, of an activator (the maximal amount for this aspect of the present invention) and said composition (bleaching composition, laundry detergent, or otherwise) comprises 15% by weight of said activator (the maximal amount by weight), said composition will comprise 25% by weight of a bleaching system (60% of which is bleach activator, 40% a source of hydrogen peroxide). However, this example is not meant to restrict the formulator to a 60:40 ratio of activator to hydrogen peroxide source.

Different embodiments of bleach containing compositions will have varying mole ratios of peroxygen bleaching compound (as AvO) to bleach activator. One embodiment of the present invention comprises a range from about 20:1 to about 1:1 bleaching compound to activator. Another embodiment comprises from about 10:1 to about 1:1 wherein from about 3:1 to 1:1 is another embodiment.

Non-limiting examples of activators are selected from the group consisting of tetraacetyl ethylene diamine (TAED), benzoylcaprolactam (BzCL), 4-nitrobenzoylcaprolactam, 3-chlorobenzoylcaprolactam, benzoyloxybenzenesulphonate (BOBS), nonanoyloxybenzenesulphonate (NOBS), phenyl benzoate (PhBz), decanoyloxybenzenesulphonate ($C_{10}$-OBS), benzoylvalerolactam (BZVL), octanoyloxybenzenesulphonate ($C_8$-OBS), perhydrolyzable esters and mixtures thereof, most preferably benzoylcaprolactam and benzoylvalerolactam. Of particular interest in one aspect of the bleach containing compositions of the present invention are bleach activators in the pH range from about 8 to about 9.5 having an OBS or VL leaving group.

Hydrophobic bleach activators include, but are not limited to, nonanoyloxybenzenesulphonate (NOBS), 4-[N-(nonanoyl)amino hexanoyloxy]-benzene sulphonate sodium salt (NACA-OBS) an example of which is described in U.S. Pat. No. 5,523,434, dodecanoyloxybenzenesulphonate (LOBS or $C_{12}$-OBS), 10-undecenoyloxybenzenesulphonate (UDOBS or $C_{11}$-OBS with unsaturation in the 10 position), and decanoyloxybenzoic acid (DOBA).

Non-limiting examples of bleach activators are those described in U.S. Pat. No. 5,698,504 Christie et al., issued Dec. 16, 1997; U.S. Pat. No. 5,695,679 Christie et al. issued Dec. 9, 1997; U.S. Pat. No. 5,686,401 Willey et al., issued Nov. 11, 1997; U.S. Pat. No. 5,686,014 Hartshorn et al., issued Nov. 11, 1997; U.S. Pat. No. 5,405,412 Willey et al., issued Apr. 11, 1995; U.S. Pat. No. 5,405,413 Willey et al., issued Apr. 11, 1995; U.S. Pat. No. 5,130,045 Mitchel et al., issued Jul. 14, 1992; and U.S. Pat. No. 4,412,934 Chung et al., issued Nov. 1, 1983, and copending patent applications U.S. Ser. Nos. 08/709,072, 08/064,564; acyl lactam activators, as described in U.S. Pat. No. 5,698,504, U.S. Pat. No. 5,695,679 and U.S. Pat. No. 5,686,014, each of which is cited herein above, are very useful herein, especially the acyl caprolactams (see for example WO 94-28102 A) and acyl valerolactams, U.S. Pat. No. 5,503,639 Willey et al., issued Apr. 2, 1996 all of which are incorporated herein by reference.

When formulating bleach activators into laundry detergent compositions U.S. Pat. No. 5,990,070 Chapman et al., issued Nov. 23, 1999; and U.S. Pat. No. 5,905,067 Chapman et al., issued May 18, 1999, both of which are included herein by reference, disclose means for employing liquid activators into solid or granular laundry detergent compositions Quaternary substituted bleach activators may also be included. The present cleaning compositions preferably comprise a quaternary substituted bleach activator (OSBA) or a quaternary substituted peracid (QSP); more preferably, the former. QSBA structures are further described in U.S. Pat. No. 5,686,015 Willey et al., issued Nov. 11, 1997; U.S. Pat. No. 5,654,421 Taylor et al., issued Aug. 5, 1997; U.S. Pat. No. 5,460,747 Gosselink et al., issued Oct. 24, 1995; U.S. Pat. No. 5,584,888 Miracle et al., issued Dec. 17, 1996; and U.S. Pat. No. 5,578,136 Taylor et al., issued Nov. 26, 1996; all of which are incorporated herein by reference.

Highly preferred bleach activators useful herein are amide-substituted as described in U.S. Pat. No. 5,698,504, U.S. Pat. No. 5,695,679, and U.S. Pat. No. 5,686,014 each of which are cited herein above. Preferred examples of such bleach activators include: (6-octanamidocaproyl) oxybenzenesulphonate, (6-nonanamidocaproyl) oxybenzenesulphonate, (6-decanamidocaproyl) oxybenzenesulphonate and mixtures thereof.

Other useful activators, disclosed in U.S. Pat. No. 5,698,504, U.S. Pat. No. 5,695,679, U.S. Pat. No. 5,686,014 each of which is cited herein above and U.S. Pat. No. 4,966,723 Hodge et al., issued Oct. 30, 1990, include benzoxazin-type activators, such as a $C_6H_4$ ring to which is fused in the 1,2-positions a moiety —C(O)OC($R^1$)=N—.

Depending on the activator and precise application, good bleaching results can be obtained from bleaching systems having with in-use pH of from about 6 to about 13, preferably from about 9.0 to about 10.5. Typically, for example, activators with electron-withdrawing moieties are used for near-neutral or sub-neutral pH ranges. Alkalis and buffering agents can be used to secure such pH.

Transition Metal Bleach Catalyst

The laundry detergent compositions of the present invention optionally comprises a bleaching system which contains one or more bleach catalysts. Selected bleach catalysts inter alia 5,12-dimethyl-1,5,8,12-tertaaza-bicyclo[6.6.2] hexadecane manganese (II) chloride may be formulated into bleaching systems which do not require a source of hydrogen peroxide or peroxygen bleach. The compositions comprise from about 1 ppb (0.0000001%), more preferably from about 100 ppb (0.00001%), yet more preferably from about 500 ppb (0.00005%), still more preferably from about 1 ppm (0.0001%) to about 99.9%, more preferably to about 50%, yet more preferably to about 5%, still more preferably to about 500 ppm (0.05%) by weight of the composition, of a transition-metal bleach catalyst Non-limiting examples of suitable manganese-based catalysts are disclosed in U.S. Pat. No. 5,576,282 Miracle et al., issued Nov. 19, 1996; U.S. Pat. No. 5,246,621 Favre et al., issued Sep. 21, 1993; U.S. Pat. No. 5,244,594 Favre et al., issued Sep. 14, 1993; U.S. Pat. No. 5,194,416 Jureller et al., issued Mar. 16, 1993; U.S. Pat. No. 5,114,606 van Vliet et al., issued May 19, 1992; U.S. Pat. No. 4,430,243 Bragg, issued Feb. 7, 1984; U.S. Pat. No. 5,114,611 van Kralingen, issued May 19, 1992; U.S. Pat. No. 4,728,455 Rerek, issued Mar. 1, 1988; U.S. Pat. No. 5,284,944 Madison, issued Feb. 8, 1994; U.S. Pat. No. 5,246,612 van Dijk et al., issued Sep. 21, 1993; U.S. Pat. No. 5,256,779 Kerschner et al., issued Oct. 26, 2993; U.S. Pat. No. 5,280,117 Kerschner et al., issued Jan. 18, 1994; U.S. Pat. No. 5,274,147 Kerschner et al., issued Dec. 28, 1993; U.S. Pat. No. 5,153,161 Kerschner et al., issued Oct. 6, 1992; and U.S. Pat. No. 5,227,084 Martens et al., issued Jul. 13, 1993; and European Pat. App. Pub. Nos. 549,271 A1, 549,272 A1, 544,440 A2, and 544, 490 A1.

Non-limiting examples of suitable cobalt-based catalysts are disclosed in U.S. Pat. No. 5,597,936 Perkins et al., issued Jan. 28, 1997; U.S. Pat. No. 5,595,967 Miracle et al., issued Jan. 21, 1997; U.S. Pat. No. 5,703,030 Perkins et al., issued Dec. 30, 1997; U.S. Pat. No. 4,810,410 Diakun et al, issued Mar. 7, 1989; M. L. Tobe, "Base Hydrolysis of Transition-Metal Complexes", *Adv. Inorg. Bioinorg. Mech.*, (1983), 2, pages 1–94; *J. Chem. Ed.* (1989), 66 (12), 1043–45; The Synthesis and Characterization of Inorganic Compounds, W. L. Jolly (Prentice-Hall; 1970), pp. 461–3; *Inorg. Chem.*, 18, 1497–1502 (1979); *Inorg. Chem.*, 21, 2881–2885 (1982); *Inorg. Chem.*, 18, 2023–2025 (1979); Inorg. Synthesis, 173–176 (1960); and *Journal of Physical Chemistry*, 56, 22–25 (1952).

Further examples of preferred macrocyclic ligand comprising bleach catalysts are described in WO 98/39406 A1 published Sep. 11, 1998 and included herein by reference. Suitable examples of these bleach catalysts include:

Dichloro-5,12-dimethyl-1,5,8,12-tetraazabicyclo[6.6.2]hexadecane manganese(II)

Diaquo-5,12-dimethyl-1,5,8,12-tetraazabicyclo[6.6.2]hexadecane manganese(II) hexafluorophosphate Aquo-hydroxy-5,12-dimethyl-1,5,8,12-tetraazabicyclo[6.6.2]hexadecane manganese(III) hexafluorophosphate Diaquo-5,12-dimethyl-1,5,8,12-tetraazabicyclo[6.6.2]hexadecane manganese(II) tetrafluoroborate Dichloro-5,12-dimethyl-1,5,8,12-tetraazabicyclo[6.6.2]hexadecane manganese(III) hexafluorophosphate Dichloro-5,12-di-n-butyl-1,5,8,12-tetraaza bicyclo[6.6.2]hexadecane manganese(II)

Dichloro-5,12-dibenzyl-1,5,8,12-tetraazabicyclo[6.6.2]hexadecane manganese(II)

Dichloro-5-n-butyl-12-methyl-1,5,8,12-tetraaza- bicyclo[6.6.2]hexadecane manganese(II)

Dichloro-5-n-octyl-12-methyl-1,5,8,12-tetraaza- bicyclo[6.6.2]hexadecane manganese(II)

Dichloro-5-n-butyl-12-methyl-1,5,8,12-tetraaza- bicyclo[6.6.2]hexadecane manganese(II).

The following are non-limiting examples of liquid laundry detergent compositions according to the present invention.

TABLE I

| Ingredients | weight % | | | |
|---|---|---|---|---|
| | 1 | 2 | 3 | 4 |
| $C_{12}$–$C_{15}$ alkyl $E_{1.1}$ sulfate | 18.00 | 14.43 | 18.00 | — |
| Linear alkyl benzene sulphonate | 2.40 | 4.44 | 5.8 | 15 |
| $C_{12}$–$C_{13}$ alkyl alcohol ethoxylate | 2.40 | 2.22 | 2.8 | 8.4 |
| $C_{10}$–$C_{12}$ alkyl psuedo quat.[1] | 1.20 | — | — | — |
| $C_8$–$C_{10}$ APA[5] | — | — | 1.4 | 1.4 |
| Amine oxide | — | 0.74 | — | — |
| Citric acid | 2.80 | 2.59 | 2.5 | 1.0 |
| $C_{12}$–$C_{18}$ alkyl fatty acid[2] | 3.20 | 2.96 | 5.0 | 10 |
| Enzymes | 3.77 | 2.83 | 3.25 | 3.25 |
| Hydrophobic dispersant[3] | 1.80 | 1.94 | 1.94 | 1.94 |
| Chelant[4] | 0.15 | 0.15 | 0.15 | 0.15 |
| Carriers/aesthetics | balance | balance | balance | balance |

[1]According to U.S. 5,916,862 Morelli et al., issued Jun. 29, 1999.
[2]From topped palm kernel oil.
[3]Daxad 11 ® ex W. R. Grace.
[4]Diethylenetriamine pentaacetate.
[5]$C_8$–$C_{10}$ APA = $C_8$–$C_{10}$ amidopropylamine The following are non-limiting examples of a light duty liquid dishwashing detergent according to the present invention.

TABLE II

| Ingredients | weight % | | | |
|---|---|---|---|---|
| | 6 | 7 | 8 | 9 |
| $C_{12}$–$C_{14}$ alkyl $E_{1.4}$ sulfate | 24.69 | 33.50 | 34.20 | — |
| $C_{12}$–$C_{14}$ alkyl $E_{2.2}$ sulfate | — | — | — | 28.80 |
| Glucose amide[1] | 3.09 | 6.00 | 4.20 | 1.43 |
| $C_{12}$–$C_{14}$ alkyl dimethyl N-oxide | 2.06 | 6.00 | 4.81 | 4.94 |
| $C_{12}$ dimethyl carboxymethyl amine[2] | 2.06 | — | — | — |
| $C_{10}$ $E_8$ alcohol | 4.11 | — | — | — |
| $C_{11}$ $E_9$ alcohol | — | 1.00 | 1.00 | 0.95 |
| Magnesium[3] | 0.49 | 0.80 | 0.72 | 0.68 |
| Calcium[4] | — | 0.40 | 0.35 | 0.33 |
| Ethanol | 7.50 | 5.00 | 5.25 | 5.85 |
| Hydrotrope[5] | 4.47 | 4.00 | 3.50 | 4.75 |
| Hydrophobic dispersant | 0.50 | 0.75 | 1.25 | 1.25 |

TABLE II-continued

| Ingredients | weight % | | | |
|---|---|---|---|---|
| | 6 | 7 | 8 | 9 |
| Carriers/aesthetics | balance | balance | balance | balance |
| Viscosity (cps) | 150 | 300 | 300 | 300 |
| pH of a 10% aqueous solution | 7.8 | 7.8 | 7.4 | 7.4 |

[1]$C_{12}$–$C_{14}$ alkyl $C_6$ glucosamine amide.
[2]Betaine surfactant.
[3]As $Mg^{2+}$.
[4]As $Ca^{2+}$.
[5]For example, sodium cumene sulphonate.
[6]Daxad 11 ® ex W. R. Grace.

What is claimed is:

1. A hydrophobic soil dispersant having the formula:

$$[CAP]-\left[\begin{array}{c}\text{naphthyl-CH}_2\\\text{SO}_3M\\R\end{array}\right]_x-\left[\begin{array}{c}\text{naphthyl-CH}_2\\\text{SO}_3M\\R\end{array}\right]_y-[CAP]$$

wherein each R is independently hydrogen, linear or branched $C_1$–$C_4$ alkyl, and mixtures thereof; [CAP] is a chain capping unit selected from i) hydrogen;

ii) an aryl unit having the formula:

$$\text{aryl with } R^1 \text{ and } SO_3M, R$$

iii) an aryl unit having the formula:

$$\text{naphthyl with } R^1 \text{ and } SO_3M, R$$

iv) and mixtures thereof;

wherein $R^1$ is hydrogen, —$CH_2OH$, —$CH_3$, and mixtures thereof; M is a water soluble cation; x is from 1 to 18, y is from 1 to 18.

2. A laundry detergent composition comprising:

a) from about 0.1% to about 10% by weight, of a hydrophobic soil dispersant having the formula:

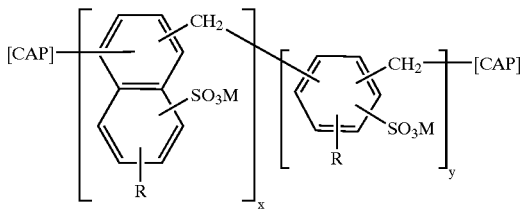

wherein each R is independently hydrogen, linear or brenched $C_1$–$C_4$ alkyl, and mixtures thereof; [CAP] is a chain capping unit selected from i) hydrogen;
ii) an aryl unit having the formula;

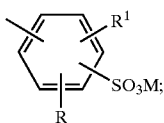

iii) an aryl unit having the formula;

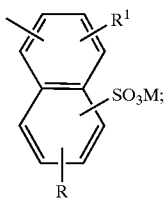

iv) and mixtures thereof;

wherein $R^1$ is hydrogen, —$CH_2OH$, —$CH_3$, and mixtures thereof; M is a water soluble cation; x is from 1 to 18, y is from 1 to 18;

b) from about 10% to about 80% by weight, of a surfactant system; and c) the balance carriers and other adjunct ingredients.

3. A composition according to claim 2 comprising from about 0.5% to about 5% by weight, of said hydrophobic soil dispersant.

4. A composition according to claim 3 comprising from about 1% to about 3% by weight, of said hydrophobic soil dispersant.

5. A composition according to claim 2 further comprising form about 0.1% to about 10% by weight, of a hydrophilic soil dispersant having the formula:

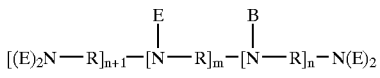

wherein R is $C_2$–$C_{12}$ linear or branched alkylene, E is hydrogen, an alkyleneoxy unit having the formula:

$R^1$ is linear or branched $C_2$–$C_4$ alkylene, $R^2$ is hydrogen, $C_1$–$C_4$ alkyl, or an anionic unit; and mixtures thereof; k has an average value from 1 to 50; B is a continuation of the backbone by branching; m is from 1 to 700; n is from 0 to 350.

6. A composition according to claim 2 comprising from about 0.1% to about 80% by weight, of said surfactant system.

7. A composition according to claim 6 comprising from about 1% to about 60% by weight, of said surfactant system.

8. A composition according to claim 7 comprising from about 10% to about 30% by weight, of said surfactant system.

9. A composition according to claim 2 wherein said surfactant system comprises:

i) from 0.01% to 80% by weight, of a surfactant selected from the group consisting of alkyl sulfate surfactants, alkoxy sulfate surfactants, mid-chain branched alkyl sulfate surfactants, mid-chain branched alkoxy sulfate surfactants, mid-chain branched aryl sulphonate surfactants, and mixtures thereof;

ii) from 0.01% to 80% by weight, of one or more aryl sulphonate anionic surfactants;

iii) from 0.01% to 80% by weight, of one or more nonionic surfactants.

10. A composition according to claim 2 further comprising from about 1% to about 80% by weight, of a detergent builder.

11. A composition according to claim 2 further comprising from about 1% to about 80% by weight, of a peroxygen bleaching system comprising:

i) from about 40% to about 99.9% by weight, of said bleaching system, a source of hydrogen peroxide;

ii) optionally from about 0.1% to about 50% by weight, of said bleaching system, a bleach activator;

iii) optionally from about 1 ppb (0.0000001%) to about 99.9% by weight of said bleaching system, of a transition-metal bleach catalyst.

* * * * *